No. 11,971. Reissued Feb. 18, 1902.
J. J. GERBER.
DISTRIBUTING SPOUT FOR GRAIN ELEVATORS.
(Application filed May 20, 1901.)
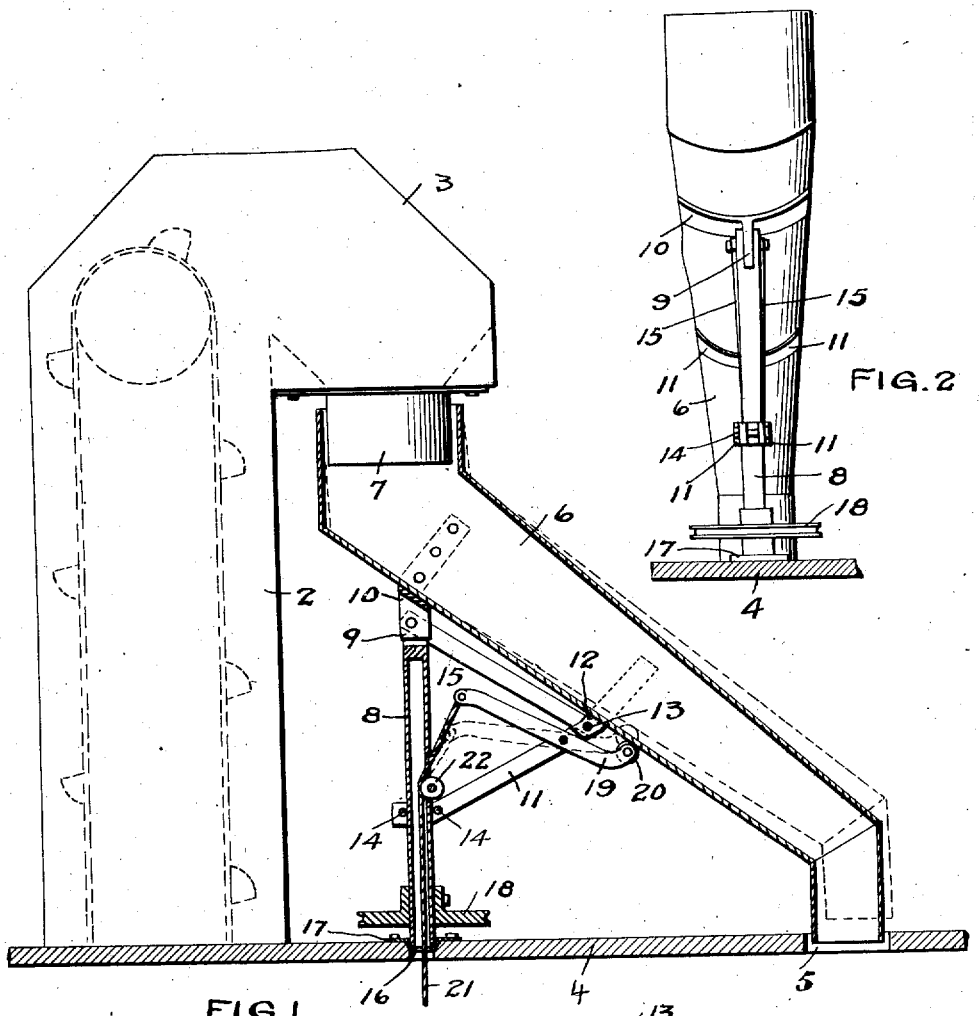
FIG. 1.
FIG. 2
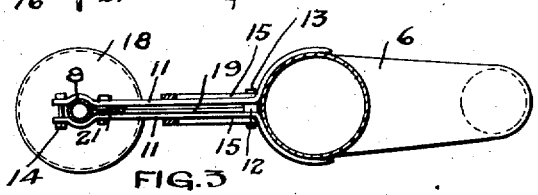
FIG. 3
WITNESSES
Edward Stone
Richard Paul
INVENTOR
JAMES J. GERBER
BY Paul & Hawley

UNITED STATES PATENT OFFICE.

JAMES J. GERBER, OF MINNEAPOLIS, MINNESOTA.

DISTRIBUTING-SPOUT FOR GRAIN-ELEVATORS.

SPECIFICATION forming part of Reissued Letters Patent No. 11,971, dated February 18, 1902.

Original No. 649,724, dated May 15, 1900. Application for reissue filed May 20, 1901. Serial No. 61,180.

*To all whom it may concern:*

Be it known that I, JAMES J. GERBER, of the city of Minneapolis, Hennepin county, Minnesota, have invented certain new and useful Improvements in Distributing-Spouts for Grain-Elevators, of which the following is a specification.

The invention relates to improvements in grain-distributers, and is designed particularly for use in country elevators where the openings leading to the bins are substantially the same distance from the grain-discharge opening in the elevator-leg and only one joint or section of spouting is necessary to reach any one of them.

The object of the invention is to provide means for lifting the distributing-spout out of the opening leading to a bin to permit it to be swung on its pivot and connected with the opening leading to another bin without the necessity of ascending to the floor where the spout is located.

The invention consists generally in various constructions and combinations, all as hereinafter described, and particularly pointed out in the claims.

In the accompanying drawings, forming part of this specification, Figure 1 is a side elevation of a portion of a grain-elevator leg and head with my improved grain-distributer shown in section applied thereto. Fig. 2 is a rear view of the distributing-spout. Fig. 3 is a sectional view on the line $x\,x$ of Fig. 1.

In the drawings, 2 represents a portion of a grain-elevator leg, and 3 the head through which the grain is delivered into a swiveled distributing-spout, which is usually located upon the machinery-floor or near the top of the elevator-building and conducts the grain from the elevator-leg to suitable openings leading to the different bins. I have shown in the drawings a floor 4, covering the bins or a portion of them, and in said floor I have shown one of a series of openings 5 that lead to the bins. There are as many of these openings as there are bins, and in country elevators they are usually arranged on the arc of a circle around the elevator-leg, so that only one swiveled spout-section is required to distribute grain to any one of the bins.

6 represents the spout-section, having its open upper end fitting loosely over a thimble 7 on the elevator-head and its lower end adapted to fit into or over one of the bin-openings 5 in the floor, but readily removable therefrom to permit the spout to be shifted to another bin. To support the spout, I prefer to provide an upright hollow standard 8, having a slot in its upper end wherein a lug 9, provided on a band or strap 10, that is riveted to the spout, is pivoted. The spout is thus permitted to swing vertically on its pivot to lift its lower end out of the openings leading to the bins. The lower portion of the spout is supported, preferably, upon a fork formed by straps 11, having their outer ends bent out to conform to the surface of the spout and form a rest and guide therefor, and secured together through a block 12 by a bolt 13 and having their inner ends clamped on the hollow standard by bolts 14. A brace 15, extending from the upper end of the hollow standard to the fork, prevents the weight of the spout from depressing the fork out of its proper position. The lower end of the standard is rounded and supported, preferably, in a depression 16, provided in a plate 17, and is adapted to turn freely therein to permit the spout to be swung from one bin to another.

18 represents an indicator-wheel provided on the standard 8, and in connection with a similar wheel located on the floor where the operator is stationed and a rope connecting said wheels the operator is able to adjust the spout to discharge grain into any desired bin without ascending to the floor where the spouts are located. This device is in common use in grain-elevators and is shown merely to illustrate a means for determining the position of the spout.

In order that the spout may be lifted up away from the opening leading to the bin by the operator stationed at a distance, I prefer to provide a lever 19, pivotally supported between the straps 11 of the fork, having its outer end upwardly turned and preferably provided with an antifriction-roller 20, adapted to bear upon and move over the under side of the spout when the lever is depressed. A cord or wire 21 is connected to the inner end of the lever 19 and preferably passes through an opening in the hollow standard over a small idler-wheel 22 and down through a hole in the plate 17 to the floor, where the operator is stationed. To move the spout from one bin-opening to another, the operator grasps the cord, depresses the lever 19, raising the spout out of the bin-opening to the position indicated by dotted lines. This upward movement of the spout will raise it from its seat in the yoke formed by the straps 11; but as these straps partially encircle the spout they will still act as a guide therefor, even when the spout is at the limit of its upward movement. When the spout is elevated, it can be readily adjusted over another bin-opening by means of the indicating mechanism described, and upon releasing the lever 19 the weight of the spout will cause it to drop back upon the supporting-fork with its lower end projecting into a bin-opening. I am thus able to move the distributing-spout from one bin to another without the necessity of ascending to the floor where the spouts are located.

In various ways the details of construction may be modified by any one skilled in the art without departing from my invention.

What I claim, and desire to secure by Letters Patent of the United States, is as follows:

1. The combination, with a grain-distributing spout, having its upper end connected with a grain-discharge opening and its lower end fitted into a bin-opening, of an upright rotatable standard, whereon said spout is pivotally supported and adapted to swing horizontally therewith and vertically thereon, a fork provided on said standard and supporting the lower portion of said spout, and a lever pivoted on said fork and having one arm in engagement with the under side of said spout and its opposite arm connected with a rope or cord, to permit the operator at a distance, to lift the lower end of said spout away from the bin-opening, substantially as described.

2. The combination, with a grain-distributing spout having its upper end connected with a grain-discharge opening and its lower end fitted into a bin-opening, of an upright rotatable standard whereon said spout is pivotally supported and adapted to swing horizontally therewith and vertically thereon, a lever 19 pivoted beneath said spout and having a roller 20 at one end to engage the under surface of said spout and roll over the same, and a cord connected to the opposite end of said lever to permit the operator at a distance to lift said spout out of a bin-opening, substantially as described.

3. The combination, with a grain-distributing spout having its upper end connected with a grain-discharge opening and its lower end fitted into a bin-opening, of an upright rotatable standard, whereon said spout is pivotally supported and adapted to swing horizontally therewith and vertically thereon, a fork 11 secured on said standard and supporting the lower portion of said spout, a brace 15 connecting said fork and said standard, a lever 19 pivoted on said fork and having one arm in engagement with the under side of said spout, and a cord connected to the other arm of said lever to permit the operator at a distance to lift the lower end of said spout out of a bin-opening, substantially as described.

4. The combination, with a grain-distributing spout having its upper end connected to a grain-discharge opening and its lower end fitted into a bin-opening, of an upright rotatable standard whereon said spout is pivotally supported and adapted to swing horizontally therewith and vertically thereon, a lever pivotally supported beneath said spout and having one arm in engagement with the under side of said spout and adapted to move over the same, and a cord connected to the opposite arm of said lever to permit the operator to lift the lower end of said spout out of a bin-opening, substantially as described.

5. The combination, with a grain-distributing spout having its upper end connected with a grain-discharge opening and its lower end fitted into a bin-opening, of a standard whereon said spout is pivotally supported and adapted to swing horizontally and vertically, an arm having a fork or yoke to support and guide the lower portion of said spout while permitting vertical movement thereof, and means independent of said yoke for raising said spout.

6. The combination, with a grain-distributing spout having its upper end connected with a grain-discharge opening and its lower end fitted into a bin-opening, of a standard whereon said spout is pivotally supported and adapted to swing horizontally and vertically, an arm provided on said standard, a yoke carried by said arm wherein the lower portion of said spout is removably supported, suitable bracing means for said arm, and means for tilting said spout vertically in said yoke, substantially as described.

7. The combination, with a grain-distributing spout having its upper end connected with a grain-discharge opening and its lower end fitted into a bin-opening, of a standard whereon said spout is pivotally supported and adapted to swing horizontally and vertically, an arm 11 secured to the lower portion of said standard and having a forked or yoke-shaped end to receive said spout, a brace 15 connecting said arm and the upper portion of said standard and forming therewith a triangular bracing-support for the lower portion of the spout, and means for lifting said spout in said yoke, for the purpose specified.

In testimony whereof I have hereunto set my hand this 11th day of May, 1901.

JAMES J. GERBER.

In presence of—
RICHARD PAUL,
M. C. NOONAN.